United States Patent
Mashio

(10) Patent No.: US 9,935,448 B2
(45) Date of Patent: Apr. 3, 2018

(54) POWER CABLE, POWER CABLE SYSTEM, METHOD OF GROUNDING POWER CABLE SYSTEM AND METHOD OF CONSTRUCTING POWER CABLE SYSTEM

(71) Applicant: SUMITOMO ELECTRIC INDUSTRIES, LTD., Osaka (JP)

(72) Inventor: Shoji Mashio, Tokyo (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/422,648

(22) Filed: Feb. 2, 2017

(65) Prior Publication Data

US 2017/0271860 A1 Sep. 21, 2017

(30) Foreign Application Priority Data

Mar. 16, 2016 (JP) .................... 2016-051963

(51) Int. Cl.
| | | |
|---|---|---|
| *H01B 9/02* | (2006.01) | |
| *H02G 9/06* | (2006.01) | |
| *H01B 9/04* | (2006.01) | |

(52) U.S. Cl.
CPC .............. *H02G 9/06* (2013.01); *H01B 9/02* (2013.01); *H01B 9/04* (2013.01)

(58) Field of Classification Search
CPC ... H02G 9/00; H02G 9/02; H02G 9/06; H01B 9/02; H01B 9/023; H01B 9/00; H01B 9/006; H01B 7/00; H01B 7/0009; H01B 7/0208; H01R 13/6592; H01R 13/6591

USPC .......... 174/68.1, 256, 260, 102 R, 104, 107, 174/102 C, 78, 5 SB, 5 R, 5 SG

See application file for complete search history.

(56) References Cited

U.S. PATENT DOCUMENTS

| | | | | |
|---|---|---|---|---|
| 4,621,169 A | * | 11/1986 | Petinelli | H01B 1/22 174/102 SC |
| 5,872,490 A | * | 2/1999 | Kamimura | H01B 11/125 174/36 |
| 7,402,753 B2 | * | 7/2008 | Varkey | H01B 7/046 174/102 R |
| 8,772,638 B2 | * | 7/2014 | Lumachi | H01B 3/30 174/107 |
| 8,916,776 B2 | * | 12/2014 | Cinquemani | H01B 7/189 174/120 R |
| 8,963,015 B2 | * | 2/2015 | Wittkop | H02G 3/0666 174/260 |
| 9,006,574 B2 | * | 4/2015 | Kagoura | H01B 7/045 174/107 |

(Continued)

OTHER PUBLICATIONS

CIGRE TB 283, Awad, Ray, et al., "Special bonding of high voltage power cables", CIGRE Working Group B1.18, Oct. 2005.

*Primary Examiner* — Angel R Estrada
(74) *Attorney, Agent, or Firm* — IPUSA, PLLC

(57) ABSTRACT

A power cable includes a conductor; an insulator; an inner shield layer; an inner corrosion-proof layer; an outer shield layer; and an outer corrosion-proof layer, provided from center toward outside, wherein only the inner shield layer among the inner shield layer and the outer shield layer is directly grounded at one end of the power cable in an axial direction, and wherein only the outer shield layer among the inner shield layer and the outer shield layer is directly grounded at the other end of the power cable in the axial direction.

8 Claims, 14 Drawing Sheets

(56) References Cited

U.S. PATENT DOCUMENTS 9,601,236 B2 * 3/2017 Gundel
9,728,904 B2 * 8/2017 Yamada ................. H01B 11/12

* cited by examiner

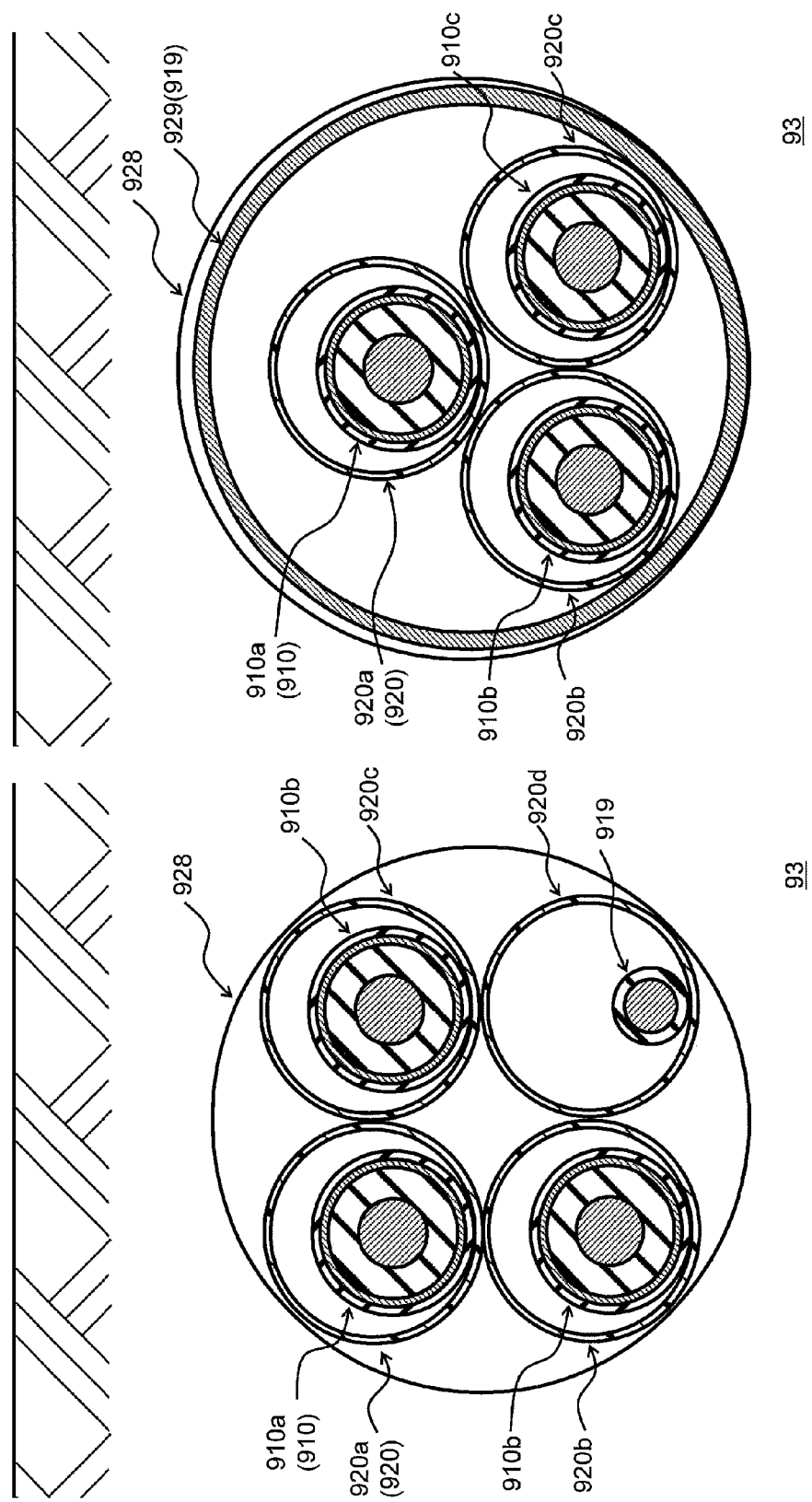

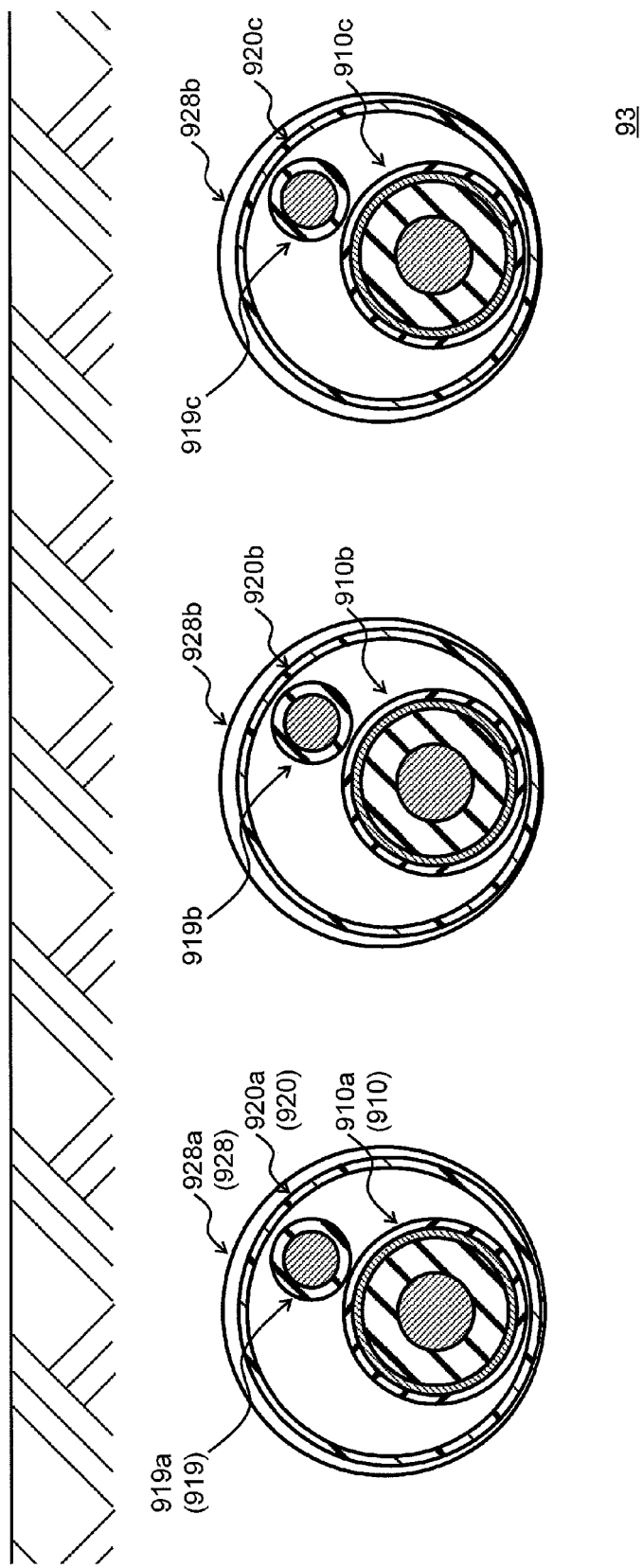

POWER CABLE, POWER CABLE SYSTEM, METHOD OF GROUNDING POWER CABLE SYSTEM AND METHOD OF CONSTRUCTING POWER CABLE SYSTEM

CROSS-REFERENCE TO RELATED APPLICATION

The present application is based on and claims the benefit of priority of Japanese Priority Application No. 2016-051963 filed on Mar. 16, 2016, the entire contents of which are hereby incorporated by reference.

BACKGROUND OF THE INVENTION

1. Field of the Invention

The present invention relates to a power cable, a power cable system, a method of grounding a power cable system and a method of constructing a power cable system.

2. Description of the Related Art

In a power cable system of a one end grounding system, a parallel ground wire may be provided along a power cable (Non-Patent Document 1, for example). With this, when a ground fault occurs, a fault current can be safely released to the parallel ground wire. Such a parallel ground wire is referred to as an Earth Continuity Conductor (ECC) by International Standard. According to the International Standard, provision of the ECC is recommended because of the above described safety.

However, for the conventional power cable system including the ECC, it is difficult to provide the ECC along the power cable when the power cable is installed over a long distance.

Non-Patent Document 1: CIGRE TB 283

SUMMARY OF THE INVENTION

The present invention is made in light of the above problems, and provides a technique by which safety can be ensured even when a power cable is installed over a long distance.

According to an embodiment, there is provided a power cable including a conductor; an insulator; an inner shield layer; an inner corrosion-proof layer; an outer shield layer; and an outer corrosion-proof layer, provided from center toward outside, wherein only the inner shield layer among the inner shield layer and the outer shield layer is directly grounded at one end of the power cable in an axial direction, and wherein only the outer shield layer among the inner shield layer and the outer shield layer is directly grounded at the other end of the power cable in the axial direction.

According to another embodiment, there is provided power cable system including a power cable including a conductor, an insulator, an inner shield layer, an inner corrosion-proof layer, an outer shield layer, and an outer corrosion-proof layer, provided from center toward outside, wherein only the inner shield layer among the inner shield layer and the outer shield layer is directly grounded at one end of the power cable in an axial direction, and wherein only the outer shield layer among the inner shield layer and the outer shield layer is directly grounded at the other end of the power cable in the axial direction.

According to another embodiment, there is provided a method of grounding a power cable system, including preparing a power cable including a conductor, an insulator, an inner shield layer, an inner corrosion-proof layer, an outer shield layer, and an outer corrosion-proof layer, provided from center toward outside; directly grounding only the inner shield layer among the inner shield layer and the outer shield layer at one end of the power cable in an axial direction; and directly grounding only the outer shield layer among the inner shield layer and the outer shield layer at the other end of the power cable in the axial direction.

According to another embodiment, there is provided a method of constructing a power cable system, including excavating a pipe line inserting hole in the ground; inserting a pipe line in the pipe line inserting hole; inserting a power cable including a conductor, an insulator, an inner shield layer, an inner corrosion-proof layer, an outer shield layer, and an outer corrosion-proof layer, provided from center toward outside, in the pipe line; directly grounding only the inner shield layer among the inner shield layer and the outer shield layer at one end of the power cable in an axial direction; and directly grounding only the outer shield layer among the inner shield layer and the outer shield layer at the other end of the power cable in the axial direction.

BRIEF DESCRIPTION OF THE DRAWINGS

Other objects, features and advantages of the present invention will become more apparent from the following detailed description when read in conjunction with the accompanying drawings.

FIG. 13A is a cross-sectional view of a first example of the power cable system of the comparative example 3 taken along a direction perpendicular to an axial direction of a power cable;

FIG. 13B is a cross-sectional view of second example of the power cable system of the comparative example 3 taken along the direction perpendicular to the axial direction of the power cable; and FIG. 14 is a cross-sectional view illustrating a third example of the power cable system of the comparative example 3 taken along the direction perpendicular to the axial direction of the power cable.

DETAILED DESCRIPTION OF THE PREFERRED EMBODIMENTS

Figure 1:
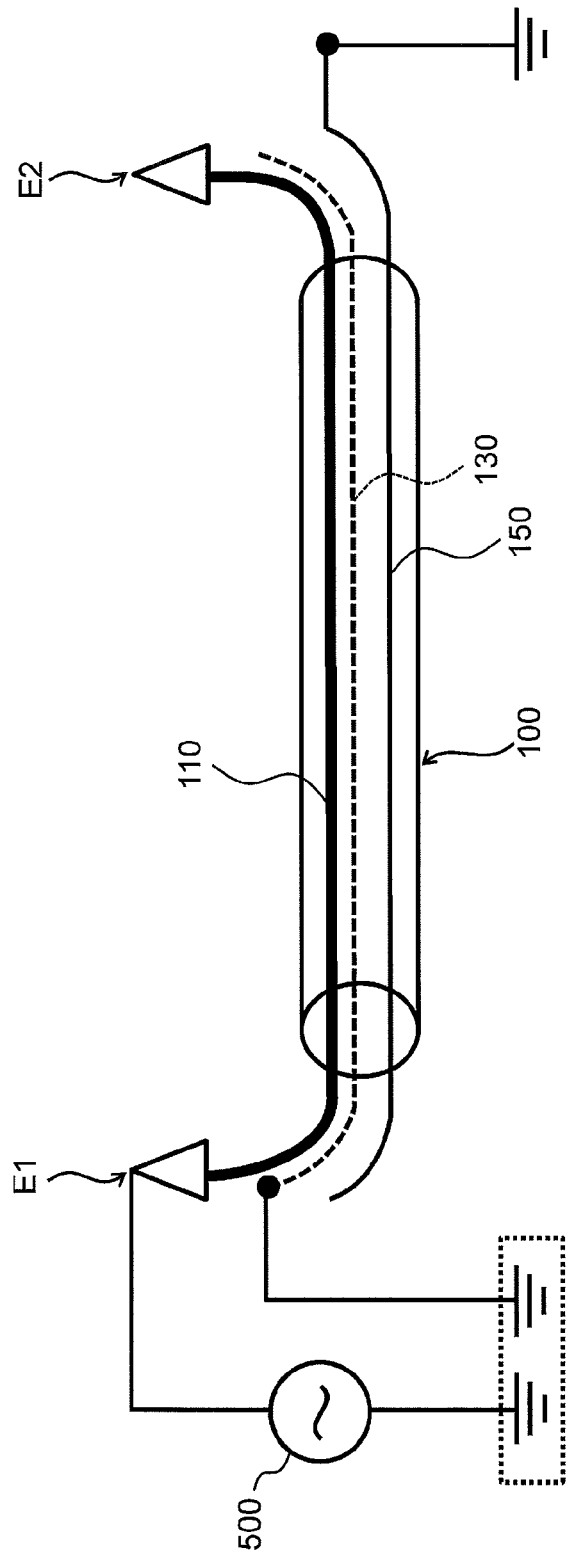
FIG. 1 is a schematic view illustrating a power cable system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

(Observations by Present Inventors)

First, observations by the present inventors are described in detail regarding a conventional method of grounding a power cable system. In the following, as conventional examples, power cable systems of three comparative examples are described.

In this specification, "grounded" or "grounding" means to be connected to an earth ground, and "directly grounded" or "directly grounding" means to be directly connected to the earth ground without passing through a resistance element or the like.

Comparative Example 1

Figure 10:
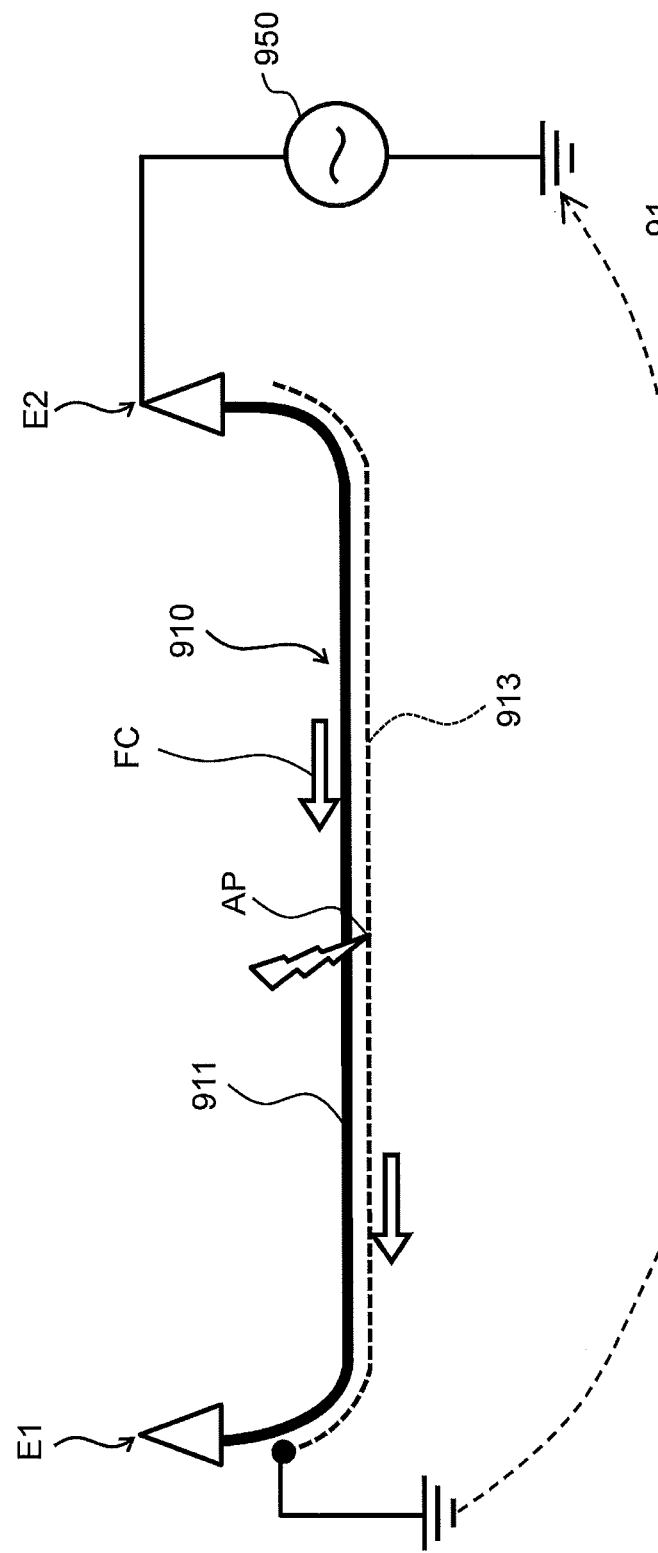
FIG. 10 is a schematic view illustrating a case when a ground fault occurs in a power cable system of a comparative example 1.

With reference to FIG. 10, a power cable system of a comparative example 1 is described. FIG. 10 is a schematic view illustrating a case in which a ground fault occurs in a power cable system 91 of the comparative example 1. In FIG. 10, a single power cable 910 of three-phase power cables 910 is illustrated.

As illustrated in FIG. 10, the power cable system 91 of the comparative example 1 is a so-called one end grounding system. Specifically, the power cable 910 includes a conductor 911, an insulator (not illustrated in the drawings), a shield layer 913 and a corrosion-proof layer (not illustrated in the drawings), provided from center toward outside, for example. The shield layer 913 is directly grounded at one end E1 of the power cable 910 in an axial direction, and the shield layer 913 is open at the other end E2 of the power cable 910 in the axial direction.

Here, there is a case that whether an electric power substation 950 as a power source is provided at the one end E1 side of the power cable 910 or at the other end E2 side of the power cable 910 is not previously known. Thus, there may be a case that the electric power substation 950 is provided at the side where the shield layer 913 is directly grounded, and a case that the electric power substation 950 is provided at a side opposite from the side where the shield layer 913 is directly grounded. FIG. 10 illustrates the latter case.

For the example of FIG. 10, when aground fault occurs in the power cable 910, a fault current (FC) flows from the other end E2 of the conductor 911 to the one end E1 of the shield layer 913 via a fault point AP. As an earth ground at the one end E1 side of the shield layer 913 is far from an earth ground at the electric power substation 950 side, the fault current that flows from the one end E1 of the shield layer 913 to the earth ground further flows to the earth ground at the electric power substation 950 side through an underground deep path. At this time, as the resistance is high at the underground deep path, there is a risk that the fault current cannot be sufficiently released to the earth ground.

Further, as the fault current flows through the underground path over a long distance, there is a risk that the fault current flows through any kinds of conductors (water pipes or the like, for example) and the fault current diffuses outside the power path of the power cable system 91.

Further, for the example of FIG. 10, when the fault current flows through the power cable 910, a large magnetic field may be generated around the power cable 910. Here, if the electric power substation 950 is provided at the side where the shield layer 913 is directly grounded, the fault current flows through the conductor 911 from the one end E1 of the conductor 911 toward the fault point AP, and then flows through the shield layer 913 from the fault point AP toward the one end E1. Thus, a direction of the fault current that flows through the conductor 911 and a direction of the fault current that flows through the shield layer 913 are opposite from each other. Thus, a magnetic field generated around the power cable 910 due to the fault current that flows through the conductor 911 and a magnetic field generated around the power cable 910 due to the fault current that flows through the shield layer 913 are canceled with each other.

However, if the electric power substation 950 is provided at the side opposite from the earth at which the shield layer 913 is directly grounded as the example of FIG. 10, the fault current flows in the same direction in both of the conductor 911 and the shield layer 913 of the power cable 910. Further, a distance between the fault current that flows through the conductor 911 and the shield layer 913 of the power cable 910, and the fault current that flows from the one end E1 of the shield layer 913 to the earth ground at the electric power substation 950 side is far. Thus, the magnetic field around the power cable 910 is not canceled and a large magnetic field is generated. As a result, for the example of FIG. 10, there is a risk that a communication failure occurs in a communication device or the like near the power cable system 91.

Comparative Example 2

Figure 11:
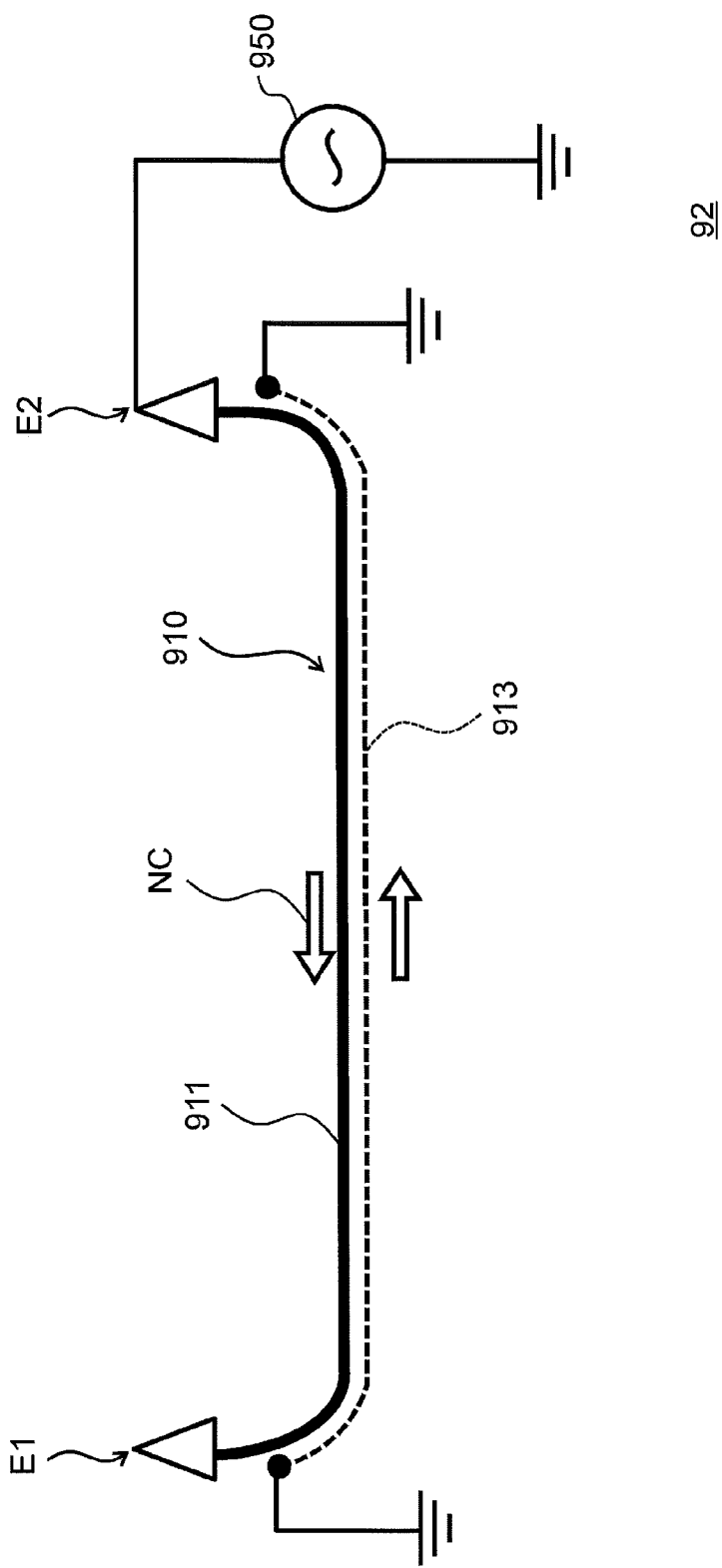
FIG. 11 is a schematic view illustrating a power cable system of a comparative example 2.

Next, with reference to FIG. 11, a power cable system of a comparative example 2 is described. FIG. 11 is a schematic view illustrating a power cable system 92 of the comparative example 2. In FIG. 11, a single power cable 910 of three-phase power cables 910 is illustrated.

As illustrated in FIG. 11, the power cable system 92 of the comparative example 2 is a both ends grounding system. The shield layer 913 is directly grounded at both of the one end E1 and the other end E2 of the power cable 910 in the axial direction.

When a ground fault occurs in the power cable 910 in a both ends grounding system as the comparative example 2, the fault current always flows to an earth ground at the electric power substation 950 side. Thus, diffusion of the fault current can be suppressed.

However, as the shield layer 913 is directly grounded at both of the one end E1 and the other end E2 of the power cable 910 in the axial direction to form a closed circuit in the comparative example 2, when a normal current (NC) flows through the conductor 911, a circulating current (induced current) flows through the shield layer 913 in a direction opposite from the normal current that flows through the conductor 911 so as to cancel the magnetic field generated around the conductor 911. Thus, in the both ends grounding system as the comparative example 2, the shield layer 913 of the power cable 910 is heated by Joule loss due to the circulating current that flows through the shield layer 913 when the normal current flows through the power cable 910.

Thus, the temperature of the conductor 911 may also be increased. As a result, the transmission capacity of the power cable 910 may be lowered.

Comparative Example 3

Figure 12:
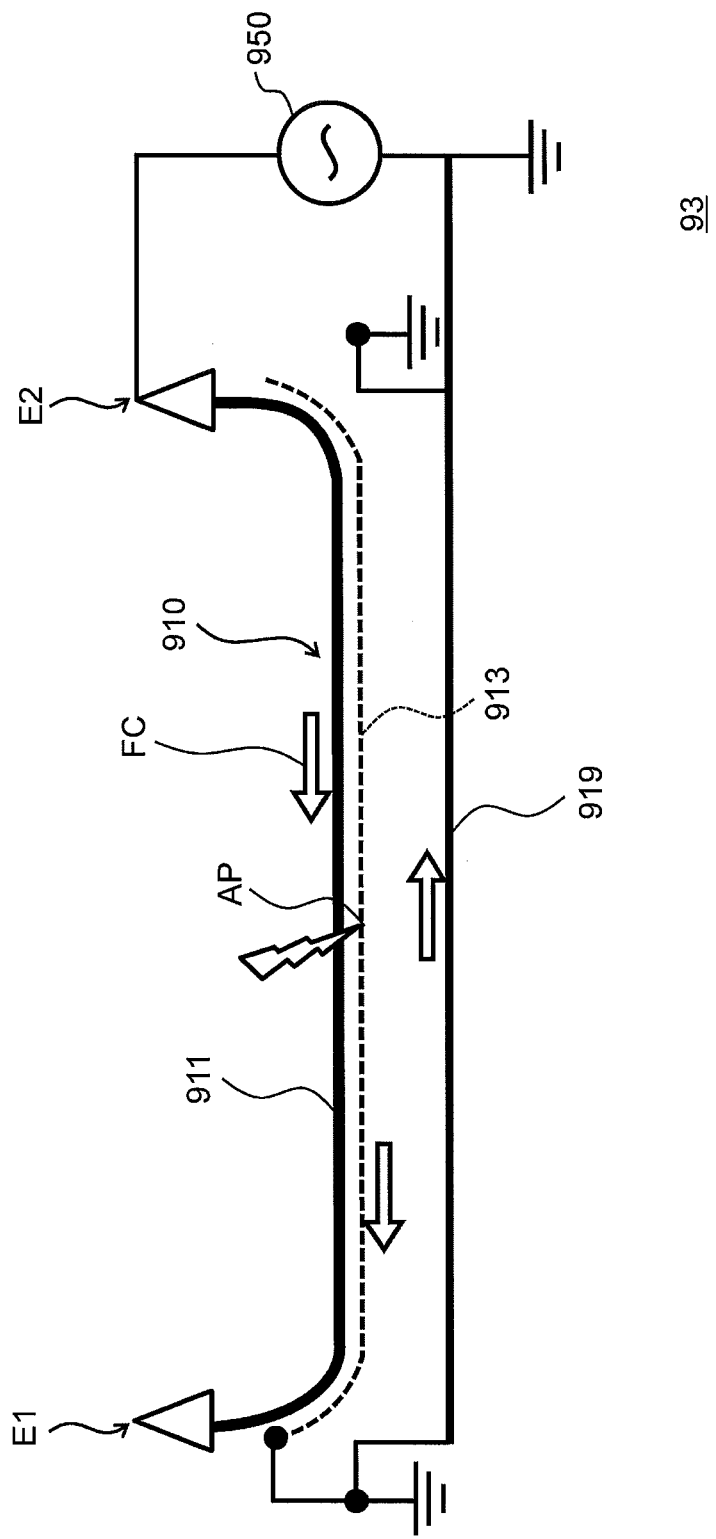
FIG. 12 is a schematic view illustrating a case when a ground fault occurs in a power cable system of a comparative example 3.

Next, with reference to FIG. 12 to FIG. 14, a power cable system of a comparative example 3 is described. FIG. 12 is a schematic view illustrating a case in which a ground fault occurs in a power cable system 93 of the comparative example 3. In FIG. 12, a single power cable 910 of three-phase power cables 910 is illustrated. FIG. 13A is a cross-sectional view of a first example of the power cable system 93 of the comparative example 3 taken along a direction perpendicular to an axial direction of the power cable 910. FIG. 13B is a cross-sectional view of second example of the power cable system 93 of the comparative example 3 taken along the direction perpendicular to the axial direction of the power cable 910. FIG. 14 is a cross-sectional view illustrating a third example of the power cable system 93 of the comparative example 3 taken along the direction perpendicular to the axial direction of the power cable 910.

As illustrated in FIG. 12, the power cable system 93 of the comparative example 3 includes a parallel ground wire 919, in addition to the shield layer 913 of the power cable 910 in order to solve the problems raised in the above described one end grounding system and both ends grounding system. Specifically, for example, the shield layer 913 is directly grounded at the one end E1 of the power cable 910 in the axial direction and the shield layer 913 is open at the other end E2 of the power cable 910 in the axial direction. The parallel ground wire 919 is provided to extend along the axial direction of the power cable 910 to be adjacent to the power cable 910. One end E1 of the parallel ground wire 919 in the axial direction is connected to the shield layer 913 of the power cable 910 and also is directly grounded. Further, the other end E2 of the parallel ground wire 919 in the axial direction is connected to the electric power substation 950 as the power source at the earth ground side and also is directly grounded. Such a parallel ground wire 919 is referred as the ECC by the International Standard as described above.

For arrangements of the power cable 910 and the parallel ground wire 919 of the power cable system 93 of the comparative example 3, for example, following two examples are raised.

In the first example illustrated in FIG. 13A, four pipe lines 920 (920a to 920d) are inserted in a pipe line inserting hole (drill hole) 928. The power cables 910a to 910c are inserted in the pipe lines 920a to 920c, respectively. The parallel ground wire 919 is inserted in the pipe line 920d.

In the second example illustrated in FIG. 13B, a steel pipe 929 is inserted in the pipe line inserting hole 928. Three of the pipe lines 920 (920a to 920c) are inserted in the steel pipe 929, and the power cables 910a to 910c are inserted in the pipe lines 920a to 920c, respectively. The steel pipe 929 is configured to function as the parallel ground wire 919.

As illustrated in FIG. 12, in the comparative example 3, when a ground fault occurs, a fault current (FC) flows from the other end E2 of the conductor 911 to the one end E1 of the shield layer 913 via a fault point AP. Then, the fault current that flows from the one end E1 of the shield layer 913 to the earth ground further flows to the earth ground at the electric power substation 950 side through the parallel ground wire 919. With this, the fault current can be safely released to the earth ground at the electric power substation 950 side. Further, as the fault current flows through the parallel ground wire 919, diffusion of the fault current outside the power path of the power cable system 93 can be suppressed. Further, the direction of the fault current that flows through the conductor 911 and the shield layer 913, and the direction of the fault current that flows through the parallel ground wire 919 are opposite from each other. With this, the magnetic field generated around the power cable 910 due to the fault current that flows through the conductor 911 and the shield layer 913, and the magnetic field generated around the power cable 910 due to the fault current that flows through the parallel ground wire 919 can be canceled with each other.

Further, in the comparative example 3, when a normal current flows through each of the three-phase power cables 910 (not illustrated in the drawings), the phase of the current that flows in each of the three-phase power cables 910 is shifted by $2\pi/3$. Thus, the magnetic field generated around the power cable 910 is canceled in total of the three-phases by the current that flows through each of the three-phase power cables 910. Thus, a large amount of circulating current does not flow through the parallel ground wire 919 that is provided to be adjacent to the power cables 910a to 910c, and the parallel ground wire 919 or the like is suppressed from being heated.

(Installation for Long Distance)

Here, if the power cable 910 is installed over a long distance, the following problem may occur when providing the parallel ground wire 919 as the ECC along the power cable 910.

When excavating the pipe line inserting hole 928 as illustrated in FIG. 13A or FIG. 13B, so-called horizontal directional drilling is used. For the structure as illustrated in the drawings, it is necessary to excavate the pipe line inserting hole 928 whose diameter is large in order to insert the plurality of the pipe lines 920 in the pipe line inserting hole 928. Thus, a large drill is necessary for excavating the pipe line inserting hole 928. When a large drill is used, it is difficult to excavate the pipe line inserting hole 928 over a long distance.

On the other hand, in order to excavate a pipe line inserting hole over a long distance, a case may be considered in which the diameter of the pipe line inserting hole is made small. For example, the diameter of the pipe line inserting hole can be made small by inserting a single pipe line in a single pipe line inserting hole. However, as positional accuracy in excavating is low in the horizontal directional drilling, it is difficult to excavate a pipe line inserting hole for the parallel ground wire to be adjacent to the pipe line inserting hole for the power cable.

Further, as another method, as the third example illustrated in FIG. 14, both of the power cable 910 and the parallel ground wire 919 may be inserted in the single pipe line 920. In such a case, for example, the power cables 910a to 910c are inserted in the pipe lines 920a to 920c, respectively, and parallel ground wires 919a to 919c are provided to extend along the power cables 910a to 910c in the pipe lines 920a to 920c, respectively. With this structure, the diameter of each of the pipe line inserting holes 928 can be made small, and the pipe line inserting hole 928 can be excavated over a long distance.

However, for the third example of FIG. 14, as the three-phase power cables 910 are provided to be apart from each other, when a normal current flows through each of the power cables 910, the magnetic field generated around each of the power cables 910 is not canceled even by the phase sift of the currents. Thus, the parallel ground wire 919 that is adjacent to the power cable 910 functions similarly as a shield layer that is grounded at both ends. With this, a circulating current flows through the parallel ground wire 919 in a direction that is opposite from the direction of the current that flows through the power cable 910 to cancel the magnetic field generated around each of the power cables 910. As a result, the parallel ground wire 919 is heated by Joule loss due to the circulating current that flows through the parallel ground wire 919. Thus, the temperature of the conductor of the power cable 910 may be also increased. As a result, the transmission capacity of the power cable 910 may be lowered.

As described above, according to the conventional power cable system using the parallel ground wire, when installing the three-phase power cables that are apart from each other over a long distance, it is difficult to provide a parallel ground wire along the power cables, for example. Thus, it is desired to provide a technique capable of ensuring safety even when a power cable is installed over a long distance. The present invention is based on the above described observations by the present inventors.

First Embodiment (1) Power Cable System

Figure 2:
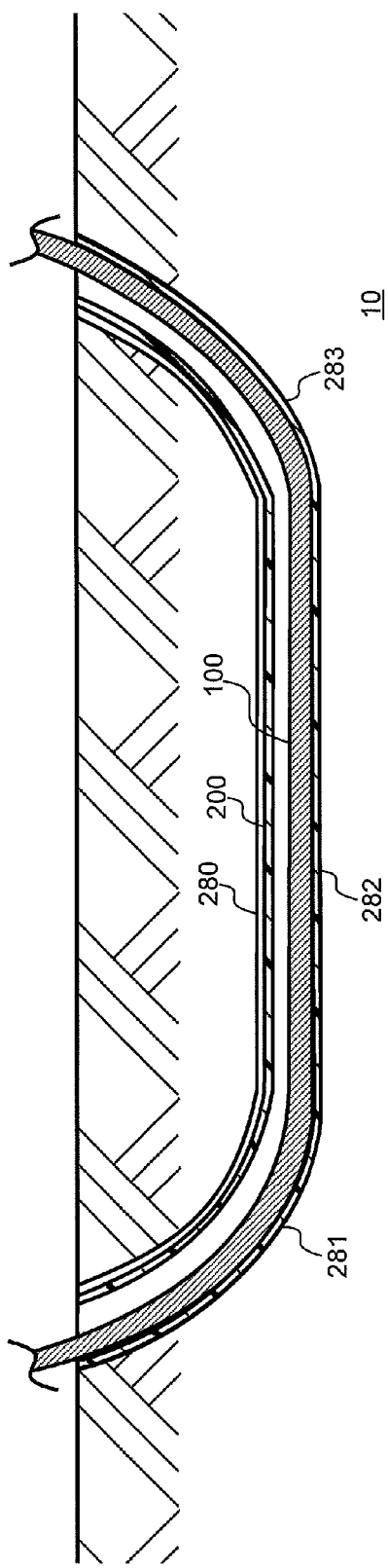
FIG. 2 is a cross-sectional view of the power cable system of the embodiment taken along an axial direction of a power cable.
Figure 3:
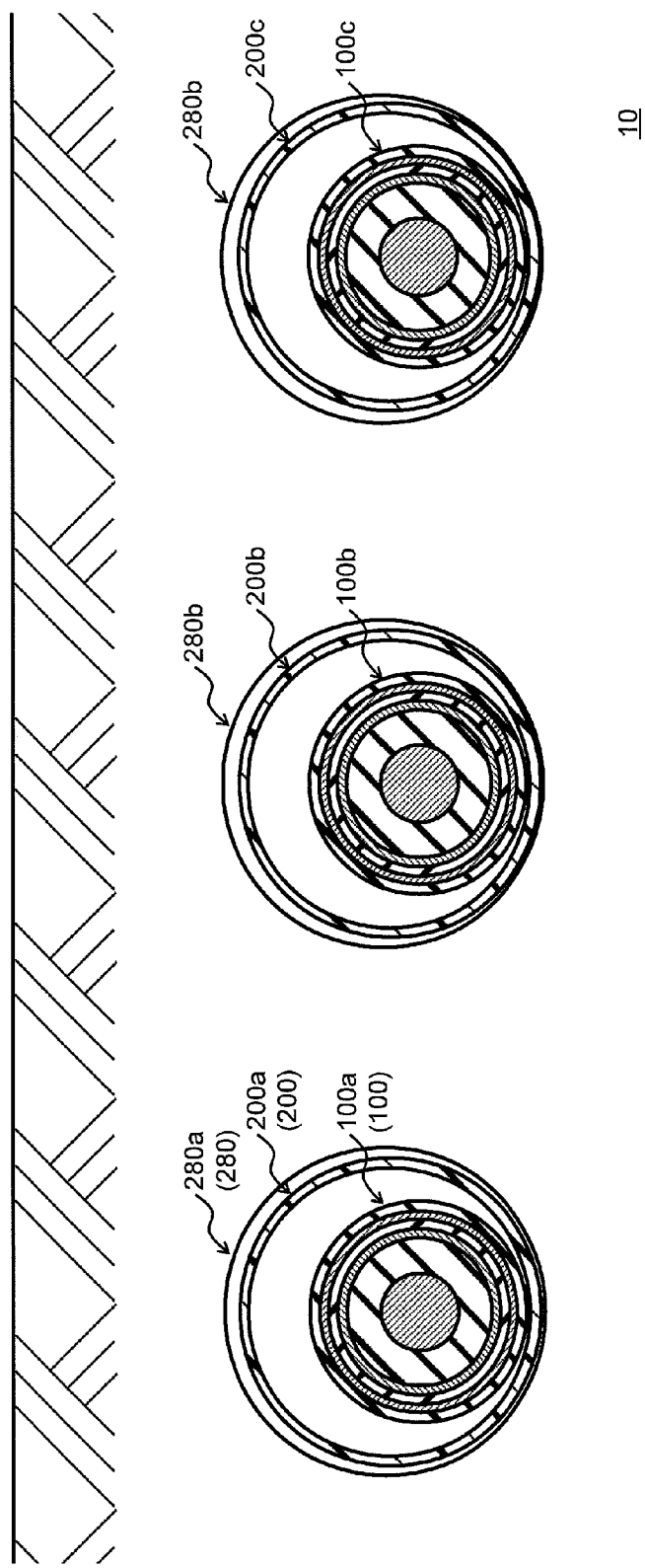
FIG. 3 is a cross-sectional view of the power cable system of the embodiment taken along a direction that is perpendicular to the axial direction of the power cable.
Figure 4:
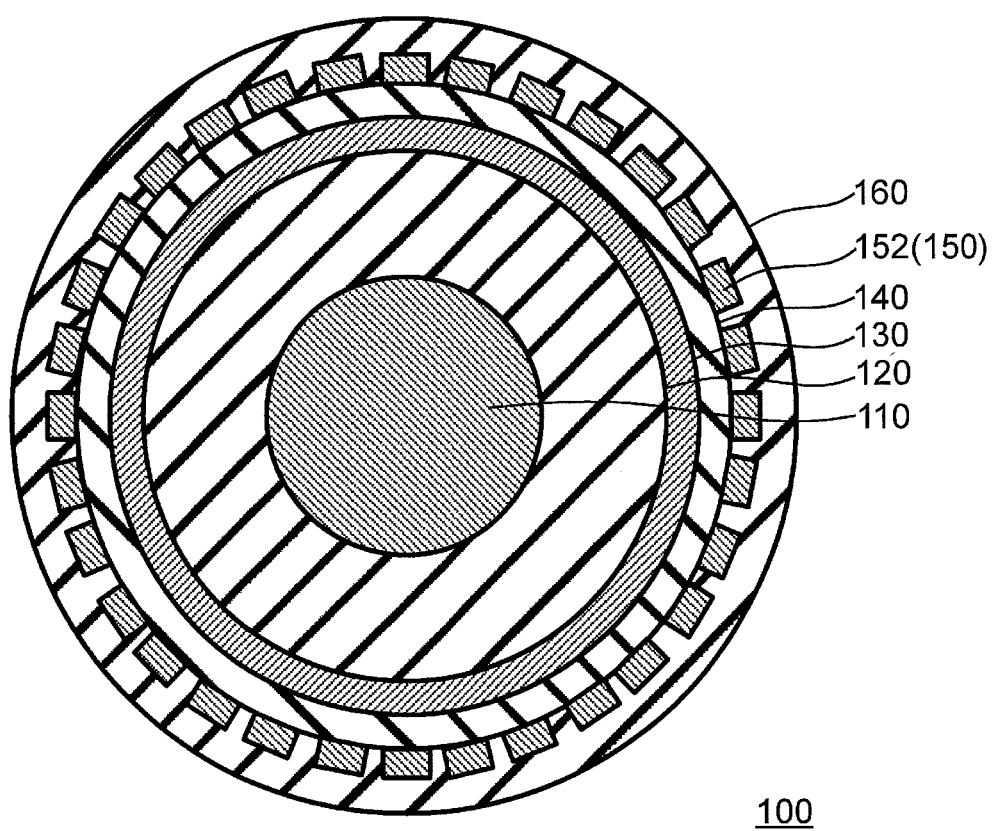
FIG. 4 is a cross-sectional view of the power cable of the embodiment taken along the direction that is perpendicular to the axial direction.

A power cable system of the embodiment is described with reference to FIG. 1 to FIG. 4. FIG. 1 is a schematic view illustrating a power cable system 10 of the embodiment. In FIG. 1, a single power cable 100 of three-phase power cables 100 is illustrated. FIG. 2 is a cross-sectional view of the power cable system 10 of the embodiment taken along an axial direction of a power cable 100. FIG. 3 is a cross-sectional view of the power cable system 10 of the embodiment taken along a direction that is perpendicular to the axial direction of the power cable 100. FIG. 4 is a cross-sectional view of the power cable 100 of the embodiment taken along the direction that is perpendicular to the axial direction.

Hereinafter, one end of the power cable 100 in the axial direction is referred to as "one end E1" and the other end of the power cable 100 in the axial direction is referred to as "the other end E2". Similarly, one end of the inner shield layer 130 in the axial direction is referred to as "one end E1 of the inner shield layer 130, and the other end of the inner shield layer 130 in the axial direction is referred to as "the other end E2 of the inner shield layer 130". This is the same for the conductor 110 or the outer shield layer 150.

Hereinafter, when each of a plurality of the same components is differentiated from each other, the component is referred to with a number and a letter, and when generally referring to the plurality of components, the components are referred to with a number only. For example, a plurality of power cables are referred to as "100" when generally referring to the power cables and when each of the plurality of power cables is differentiated from each other, the power cable is referred to as "100*a*" or the like.

As illustrated in FIG. 1 to FIG. 3, the power cable system 10 of the embodiment is structured as a high voltage underground power transmission line, and has a new grounding structure that does not use a parallel ground wire as the ECC. The power cable system 10 includes power cables 100 and pipe lines 200, for example.

(Pipe Line)

As illustrated in FIG. 2 and FIG. 3, the power cable system 10 is configured such that the three-phase power cables 100 are inserted in the three pipe lines 200, respectively, for example. Specifically, three pipe line inserting holes (drill holes) 280 (280*a* to 280*c*) are formed in the ground by horizontal directional drilling, for example. Each of the pipe line inserting holes 280 includes a first inclined portion 281 that is excavated from a surface in a diagonally downward direction into the ground, a horizontal portion 282 that is excavated from an end portion of the first inclined portion 281 in a horizontal direction at a predetermined depth, and a second inclined portion 283 that is excavated from an end portion of the horizontal portion 282 in a diagonally upward direction toward the surface. The pipe line inserting holes 280*a* to 280*c* are provided to extend in the same direction, and provided to be apart from each other with a predetermined distance in a horizontal direction. The pipe lines 200*a* to 200*c* are inserted in the pipe line inserting holes 280*a* to 280*c*, respectively. Each of the pipe lines 200*a* to 200*c* is made of polyethylene, PVC (Polyvinylchloride), FRP (Fiber Reinforced Plastics) or the like, for example. The power cables 100*a* to 100*c* are inserted in the pipe lines 200*a* to 200*c*, respectively.

For a specific size, the distance of the power cable 100 in the axial direction (the distance of the pipe line inserting hole 280 in the axial direction, or the distance of the pipe line 200 in the axial direction) is greater than or equal to 1 km and less than or equal to 5 km, for example. When the distance of the power cable 100 in the axial direction is greater than or equal to 1 km, it is difficult to excavate a large pipe line inserting hole by horizontal directional drilling using a large drill to install three-phase power cables in a single pipe line inserting hole. Thus, an effect of applying the grounding structure of the embodiment, which will be described later, may be particularly obtained when the distance of the power cable 100 in the axial direction is greater than or equal to 1 km. When the distance of the power cable 100 in the axial direction is less than or equal to 5 km, the pipe line inserting hole 280 can be appropriately excavated by applying horizontal directional drilling, and the grounding structure, which will be described later, can be stably applied.

Further, when a nominal voltage of the power cable 100 is greater than or equal to 66 kV and less than or equal to 500 kV and the diameter (external diameter) of the power cable 100 is greater than or equal to 50 mm and less than or equal to 170 mm, for example, the inside diameter of the pipe line 200 is greater than or equal to 115% of the diameter of the power cable 100, for example. When the inside diameter of the pipe line 200 is greater than or equal to 115% of the diameter of the power cable 100, the power cable 100 can be easily inserted in the pipe line 200. Although the upper limit of the inside diameter of the pipe line 200 is not specifically limited, the substantial external diameter of the pipe line 200 is less than or equal to 400 mm, for example. When the external diameter of the pipe line inserting hole 280 is less than or equal to 400 mm, the pipe line inserting hole 280 can be appropriately excavated over a long distance.

Further, a space between the pipe lines 200 in the horizontal direction is greater than or equal to 1.5 m, for example. When the space between the pipe lines 200 in the horizontal direction is greater than or equal to 1.5 m, the adjacent pipe line inserting holes 280 (in other words, the adjacent pipe lines 200) can be suppressed from interrupting with each other even though the positional accuracy in excavating is not so high in the horizontal directional drilling. Although the upper limit of the space between the pipe lines 200 in the horizontal direction is not specifically limited, the space between the pipe lines 200 in the horizontal direction is less than or equal to 20 m, for example. For the above described example illustrated in FIG. 14, when the space between the pipe lines 920 in the horizontal direction is less than or equal to 20 m, it is difficult to diffuse heat from each of the three-phase power cables 910. Thus, an effect of applying the grounding structure of the embodiment, which will be described later, may be particularly obtained when the space between the pipe lines 200 in the horizontal direction is less than or equal to 20 m.

(Power Cable)

As illustrated in FIG. 4, the power cable 100 of the embodiment is constituted as a so-called solid insulation cable (a Cross-linked polyethylene insulated polyvinylchloride sheathed Cable or an XLPE cable), for example, and includes a conductor 110, an insulator 120, an inner shield layer 130, an inner corrosion-proof layer 140, an outer shield layer 150 and an outer corrosion-proof layer 160, provided from center toward outside.

The conductor 110 is configured by cabling a plurality of copper wires, for example. The insulator 120 is provided to cover an outer periphery of the conductor 110, and is made of cross-linked polyethylene, for example.

The inner shield layer 130 is configured as a path to flow a fault current. Specifically, the inner shield layer 130 is configured as a tubular extrusion sheath that covers an outer periphery of the insulator 120, for example. The inner shield layer 130 is made of aluminum (Al) or lead (Pb), for example.

The inner corrosion-proof layer 140 is provided to cover an outer periphery of the inner shield layer 130. The inner corrosion-proof layer 140 is configured to suppress corrosion of the inner shield layer 130 or the like, that is provided inside, and to insulate (electrically isolate) the inner shield layer 130 and the outer shield layer 150 from each other. The inner corrosion-proof layer 140 is made of cross-linked polyethylene or PVC, for example.

The outer shield layer 150 is configured as a path through which a fault current flows. Specifically, the outer shield layer 150 is configured by spirally winding or longitudinally lapping a plurality of flat wires 152, made of copper, around an outer periphery of the inner corrosion-proof layer 140. The flat wires 152 that constitute the outer shield layer 150 are placed on a concentric circle of the inner shield layer 130. By configuring the outer shield layer 150 as such, when the power cable 100 is tugged over a long distance, tension of the power cable 100 can be loaded on the outer shield layer 150.

The outer corrosion-proof layer 160 is provided to cover an outer periphery of the outer shield layer 150. The outer corrosion-proof layer 160 is configured to suppress corrosion of the outer shield layer 150 or the like, that is provided inside. The outer corrosion-proof layer 160 is made of cross-linked polyethylene or PVC, for example.

For specific sizes, when a nominal voltage of the power cable 100 is greater than or equal to 66 kV and less than or equal to 500 kV, the diameter of the conductor 110 is greater than or equal to 20 mm and less than or equal to 70 mm, the thickness of the insulator 120 is greater than or equal to 9 mm and less than or equal to 30 mm, and the thickness of the inner shield layer 130 is greater than or equal to 0.5 mm and less than or equal to 4.0 mm, for example. The thickness of the inner corrosion-proof layer 140 is greater than or equal to 1 mm and less than or equal to 8 mm, for example. When the thickness of the inner corrosion-proof layer 140 is greater than or equal to 1 mm, the inner shield layer 130 and the outer shield layer 150 can be sufficiently insulated from each other. When the thickness of the inner corrosion-proof layer 140 is less than or equal to 8 mm, the external diameter of the power cable 100 can be retained in an appropriate size.

The thickness of the outer shield layer 150 (the thickness in a radial direction) is greater than or equal to 0.5 mm and less than or equal to 4.0 mm, and the thickness of the outer corrosion-proof layer 160 is greater than or equal to 1.0 mm and less than or equal to 8.0 mm, for example.

(Grounding Structure)

As illustrated in FIG. 1, according to the power cable system 10 of the embodiment, the inner shield layer 130 and the outer shield layer 150 of the power cable 100 are grounded by different ways. Here, the power cables 100a to 100c have the same grounding structure. Further, for the example of FIG. 1, the electric power substation 500 as the power source is connected to the conductor 110 at the one end E1 of the power cable 100 in the axial direction, for example.

The inner shield layer 130 is directly grounded at the one end E1 of the power cable 100 in the axial direction. The inner shield layer 130 is grounded in a location of the electric power substation 500 (within a dotted line) so that its electric potential becomes the same as that of the earth ground at the electric power substation 500 side. On the other hand, the inner shield layer 130 is open at the other end E2 of the power cable 100 in the axial direction.

Meanwhile, the outer shield layer 150 is directly grounded at the other end E2 of the power cable 100 in the axial direction. On the other hand, the outer shield layer 150 is open at the one end E1 of the power cable 100 in the axial direction.

As both of the inner shield layer 130 and the outer shield layer 150 are directly grounded at opposite end portions from each other, when a ground fault occurs in the power cable 100, a fault current can flow toward the earth ground at the electric power substation 500 side for both cases when the electric power substation 500 is connected to the one end E1 of the power cable 100 in the axial direction and when the electric power substation 500 is connected to the other end E2 of the power cable 100 in the axial direction through either of the inner shield layer 130 and the outer shield layer 150. This point is described later in detail.

(2) Flow of Fault Current when Ground Fault Occurs

Figure 5:
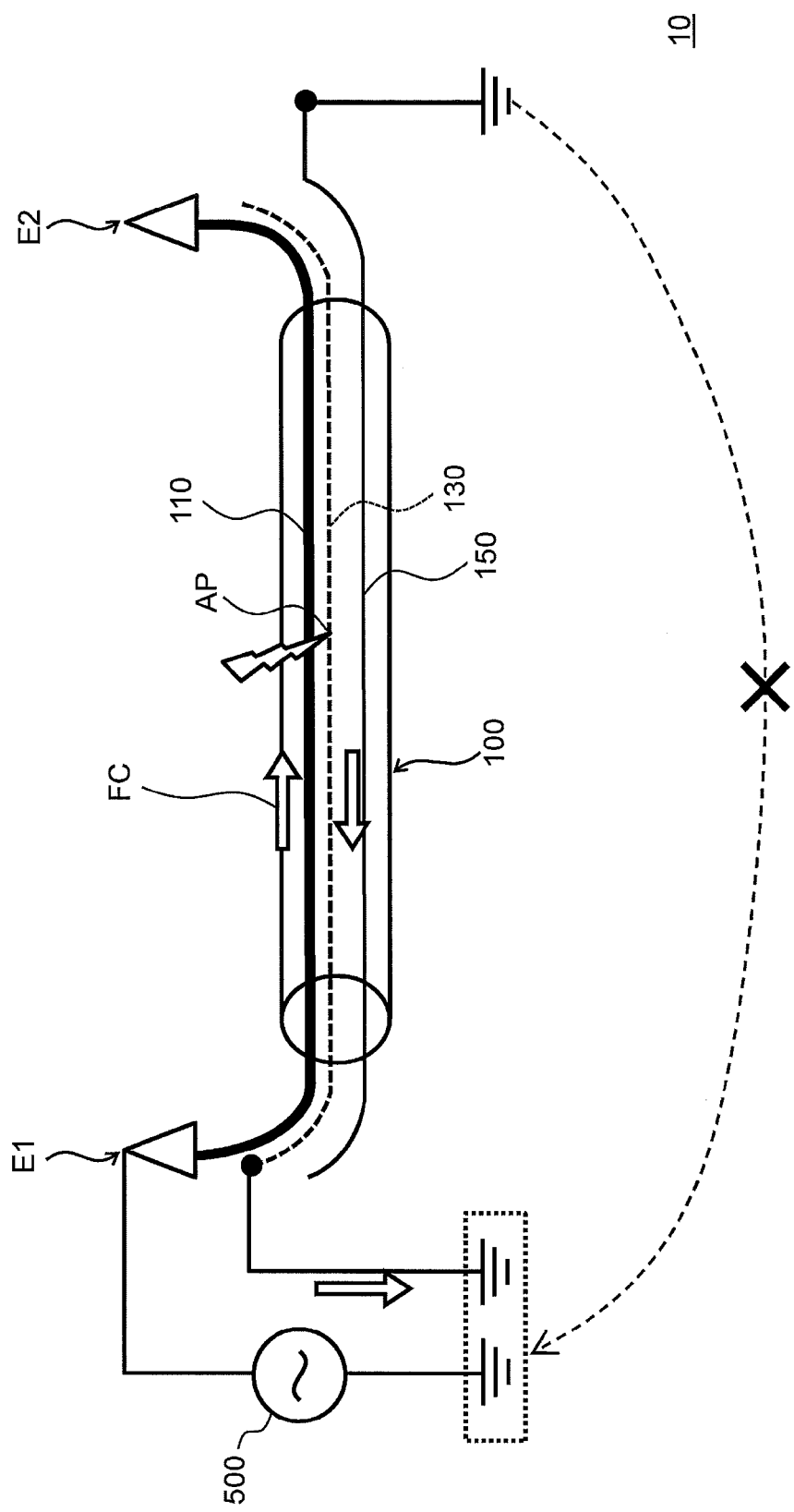
FIG. 5 is a schematic view illustrating a first example when a ground fault occurs in the power cable system of the embodiment.
Figure 6:
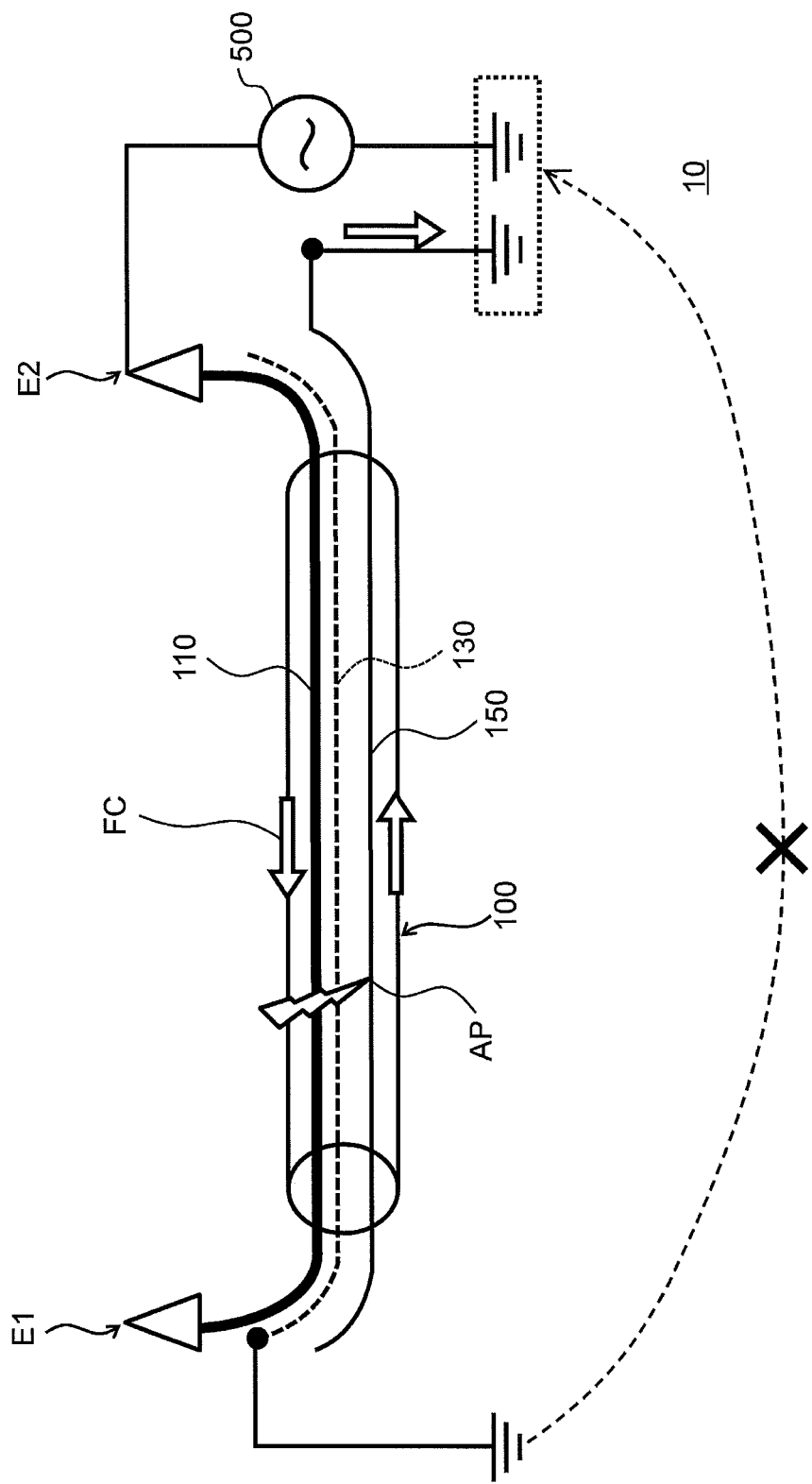
FIG. 6 is a schematic view illustrating a second example when a ground fault occurs in the power cable system of the embodiment.

Next, with reference to FIG. 5 and FIG. 6, flow of a fault current when a ground fault occurs in the power cable system 10 is described. FIG. 5 is a schematic view illustrating a first example when a ground fault occurs in the power cable system 10 of the embodiment. FIG. 6 is a schematic view illustrating a second example when a ground fault occurs in the power cable system 10 of the embodiment.

Here, as described above, there is a case that whether the electric power substation 500 as the power source is provided at the one end E1 side of the power cable 100 in the axial direction or at the other end E2 side of the power cable 100 in the axial direction is not previously known. Hereinafter, it is assumed that in the first example, the electric power substation 500 as the power source is connected to the conductor 110 at the one end E1 of the power cable 100 in the axial direction, and in the second embodiment, the electric power substation 500 as the power source is connected to the conductor 110 at the other end E2 of the power cable 100 in the axial direction.

First Example

In the first example of FIG. 5, it is assumed that a ground fault occurs in the power cable 100 due to external force applied from an outer periphery of the power cable 100, due to an internal failure of an insulator 120 or the like, and the conductor 110 is short-circuited with the outer shield layer 150 via the inner shield layer 130 at a fault point AP. At this time, a fault current (FC) flows from the one end E1 side of the conductor 110, that is connected to the electric power substation 500, to the fault point AP. Here, as described above, the one end E1 of the inner shield layer 130 is directly grounded and the other end E2 of the inner shield layer 130 is open. Thus, the fault current does not flow to an earth ground at the other end E2 side of the inner shield layer 130, but flows to an earth ground at the one end E1 side of the inner shield layer 130 by returning at the fault point AP. As such, the fault current can be safely released to the earth ground at the one end E1 side of the inner shield layer 130, in other words, the earth ground at the electric power substation 500 side.

At this time, as the conductor 110 to the outer shield layer 150 are short-circuited at the fault point AP, the fault current may flow through the outer shield layer 150. However, in the first example, due to the following reason, the fault current hardly flows through the outer shield layer 150. Specifically, as described above, the one end E1 of the outer shield layer 150 is open, and the other end E2 of the outer shield layer 150 is directly grounded. Thus, if the fault current flows through the outer shield layer 150 as well, the fault current may not flow to the one end E1 side of the outer shield layer 150, but may flow to the earth ground at the other end E2 side of the outer shield layer 150 via the fault point AP. As the earth ground at the other end E2 side of the outer shield layer 150 is far from the earth ground at the electric power substation 500 side, the fault current that flows from the other end E2 of the outer shield layer 150 to the earth ground tends to further flow to the earth ground at the electric power substation 500 side through an underground deep path (as illustrated by a dotted line in the FIG. 5). However, as the resistance is high at the underground deep path, the fault current hardly flows through a path from the fault point AP to the earth ground at the electric power substation 500 side via the earth ground at the other end E2 side of the outer shield layer 150. Thus, in the first example, if the ground fault occurs in the power cable 100, the fault current mainly flows from the fault point AP toward the earth ground at the one end E1 side of the inner shield layer 130 through the inner shield layer 130. With this, the fault current is suppressed from diffusing outside the power path of the power cable system 10 in the ground.

Further, at this time, a direction of the fault current that flows through the conductor 110 and a direction of the fault current that flows through the inner shield layer 130 are opposite from each other. With this, the magnetic field generated around the power cable 100 due to the fault current that flows through the conductor 110 and the magnetic field generated around the power cable 100 due to the fault current that flows through the inner shield layer 130 can be canceled with each other.

Second Example

In the second example of FIG. 6, similar to the first example, it is assumed that a ground fault occurs in the power cable 100, and the conductor 110 is short-circuited with the outer shield layer 150 via the inner shield layer 130 at a fault point AP. At this time, the fault current (FC) flows from the other end E2 side of the conductor 110, that is connected to the electric power substation 500, to the fault point AP. Here, as described above, the other end E2 of the outer shield layer 150 is directly grounded and the one end E1 of the outer shield layer 150 is open. Thus, the fault current does not flow to an earth ground at the one end E1 side of the outer shield layer 150, but flows to an earth ground at the other end E2 side of the outer shield layer 150 by returning at the fault point AP. As such, the fault current can be safely released to the earth ground at the other end E2 side of the outer shield layer 150, in other words, to the earth ground at the electric power substation 500 side.

At this time, the conductor 110 and the inner shield layer 130 are short-circuited at the fault point AP, not only the conductor 110 and the outer shield layer 150 are short-circuited. Thus, the fault current may flow through the inner shield layer 130. However, in the second example, due to the following reason, the fault current hardly flows through the inner shield layer 130. Specifically, as described above, the one end E1 of the inner shield layer 130 is directly grounded and the other end E2 of the inner shield layer 130 is open. Thus, if the fault current flows through the inner shield layer 130 as well, the fault current may not flow to the other end E2 side of the inner shield layer 130, but may flow to the earth ground at the one end E1 side of the inner shield layer 130 via the fault point AP. As the earth ground at the one end E1 side of the inner shield layer 130 is far from the earth ground at the electric power substation 500 side, the fault current that flows from the one end E1 of the inner shield layer 130 to the earth ground tends to further flow to the earth ground at the electric power substation 500 side through an underground deep path (a dotted line in FIG. 6). However, as the resistance is high in the underground deep path, the fault current hardly flows through a path from the fault point AP to the earth ground at the electric power substation 500 side via the earth ground at the one end E1 side of the inner shield layer 130. Thus, in the second example, if the ground fault occurs in the power cable 100, the fault current mainly flows from the fault point AP toward the earth ground at the other end E2 side of the outer shield layer 150 through the outer shield layer 150. With this, the fault current is suppressed from diffusing outside of the power path of the power cable system 10 in the ground.

Further, at this time, a direction of the fault current that flows through the conductor 110 and a direction of the fault current that flows through the outer shield layer 150 are opposite from each other. With this, the magnetic field generated around the power cable 100 due to the fault current that flows through the conductor 110 and the magnetic field generated around the power cable 100 due to the fault current that flows through the outer shield layer 150 can be canceled with each other.

Figure 7:
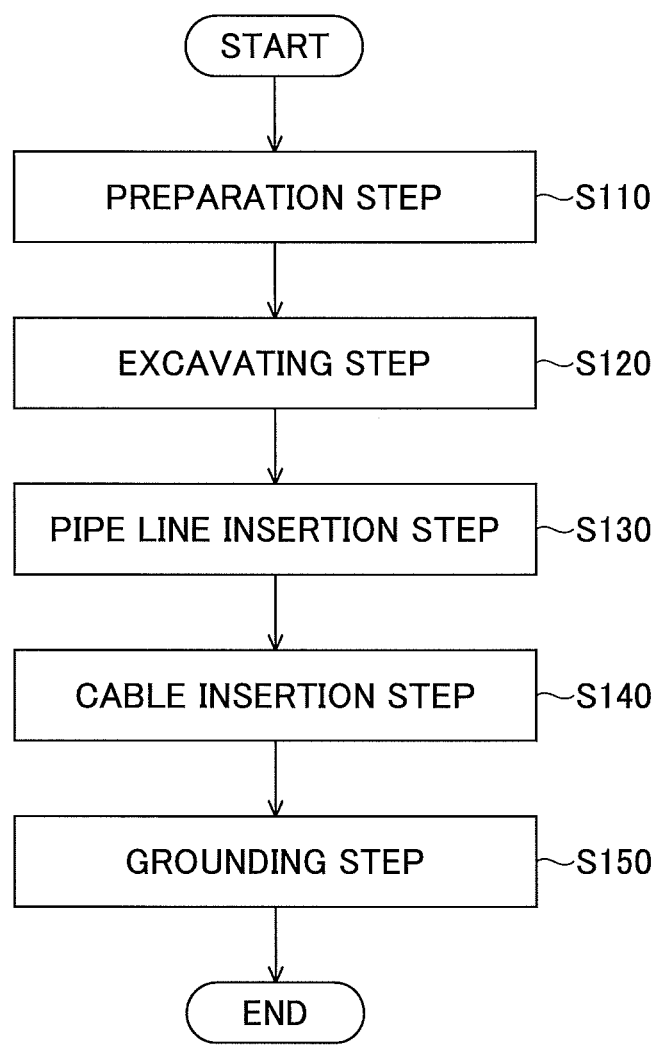
FIG. 7 is a flowchart illustrating a method of constructing the power cable system of the embodiment.
Figure 8:
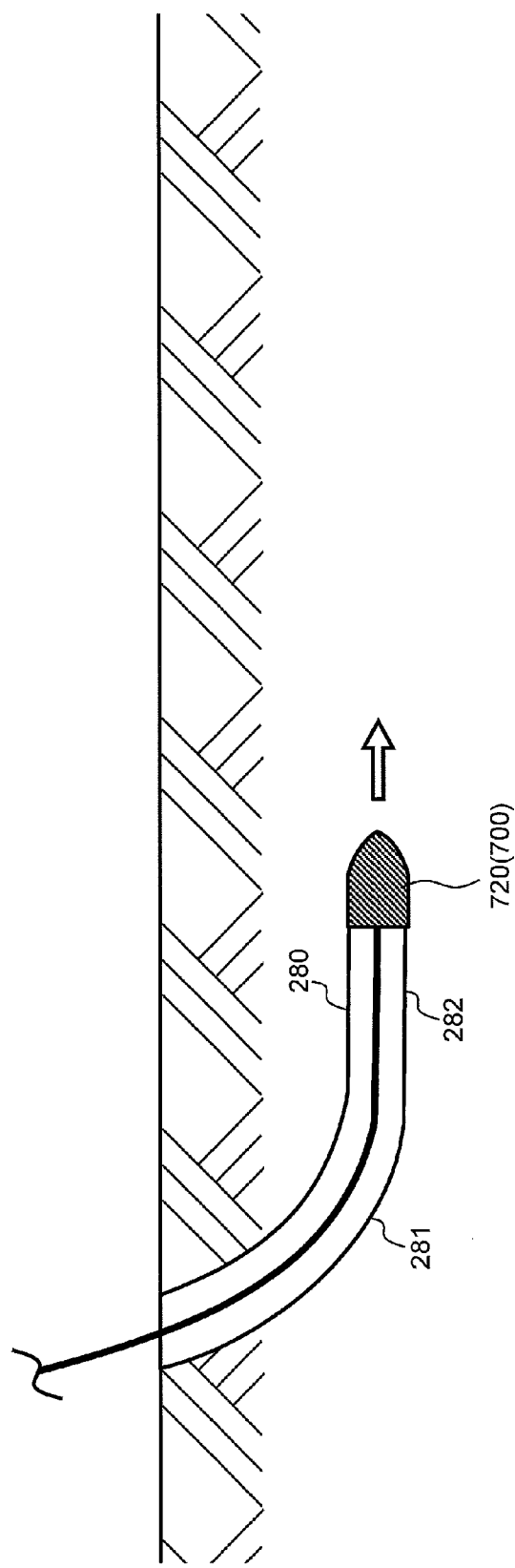
FIG. 8 is a schematic view illustrating an excavating step.
Figure 9:
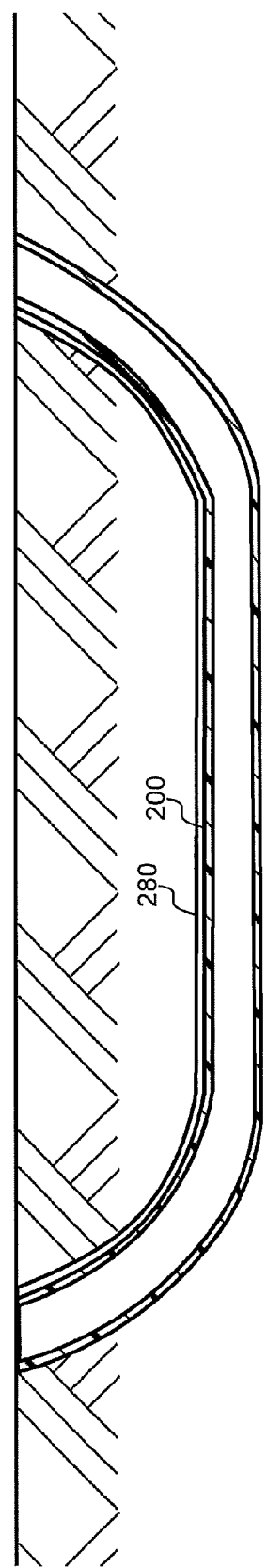
FIG. 9 is a schematic view illustrating a pipe line insertion step.

(3) Method of Constructing Power Cable System and Method of Grounding Power Cable System Next, with reference to FIG. 1, FIG. 2 and FIG. 7 to FIG. 9, a method of constructing the power cable system 10 of the embodiment and a method of installing the power cable system 10 of the embodiment are described. FIG. 7 is a flowchart illustrating a method of constructing the power cable system 10 of the embodiment. FIG. 8 is a schematic view illustrating an excavating step. FIG. 9 is a schematic view illustrating a pipe line insertion step.

(S110: Preparation Step)

First, the power cable 100 including the conductor 110, the insulator 120, the inner shield layer 130, the inner corrosion-proof layer 140, the outer shield layer 150 and the outer corrosion-proof layer 160, provided from center toward outside, is prepared. For a specific method of manufacturing the power cable 100, for example, while moving the conductor 110 in the axial direction, the insulator 120 is extrusion coated to cover an outer periphery of the conductor 110. Next, the inner shield layer 130, constituted as an extrusion sheath, is extrusion coated to cover an outer periphery of the insulator 120. Next, the inner corrosion-proof layer 140 is extrusion coated to cover an outer periphery of the inner shield layer 130. Next, the outer shield layer 150 is formed by helically winding the plurality of flat wires 152 or the like to cover an outer periphery of the inner corrosion-proof layer 140. Next, the outer corrosion-proof layer 160 is extrusion coated to cover an outer periphery of the outer shield layer 150. With such a manufacturing method, three of the power cables 100 are manufactured.

Further, the pipe line 200 having an inside diameter in which the power cables 100 are capable of being inserted is prepared. The pipe line 200 is continuously extrusion molded so that its length becomes the same as the installing distance of the power cables 100, for example.

(S120: Excavating Step)

Next, as illustrated in FIG. 8, a pipe line inserting hole 280 is formed in the ground by excavating the ground while rotating a drill 720 of an excavator 700 by horizontal directional drilling. Specifically, the first inclined portion 281 of the pipe line inserting hole 280 is formed by excavating diagonally downward from a surface to the underground. Then, the horizontal portion 282 of the pipe line inserting hole 280 is formed by excavating along a horizontal direction at a predetermined depth from an end portion of the first inclined portion 281. Then, the second inclined portion 283 (see FIG. 2) of the pipe line inserting hole 280 is formed by excavating diagonally upward from an end portion of the horizontal portion 282 to the surface. By such a method, the three pipe line inserting holes 280 that are extending in the same direction and are apart from each other with a predetermined distance in a horizontal direction are excavated. Here, after excavating each of the pipe line inserting holes 280, a liquid material is pressure injected in the respective pipe line inserting hole 280 in order to suppress collapse of the pipe line inserting hole 280 before inserting the pipe line 200.

(S130: Pipe Line Insertion Step)

Next, as illustrated in FIG. 9, the pipe line 200 is inserted in the pipe line inserting hole 280. Specifically, first, a pulling eye (pulling jig) (not illustrated in the drawings) is attached to a front end of the pipe line 200. Next, a wire (not illustrated in the drawings) that is previously inserted in the pipe line inserting hole 280 is connected to the pulling eye. Then, the pipe line 200 is inserted in the pipe line inserting hole 280 by pulling the wire. By such a method, the three pipe lines 200 are inserted in the three pipe line inserting holes 280, respectively.

(S140: Cable Insertion Step)

Next, as illustrated in FIG. 2, the power cable 100 is inserted in the pipe line 200. Specifically, first, a pulling eye (not illustrated in the drawings) is attached to a front end of the power cable 100. Next, a wire (not illustrated in the drawings) that is previously inserted in the pipe line 200 is connected to the pulling eye. Then, the power cable 100 is inserted in the pipe line 200 by pulling the wire. By such a method, the power cables 100 are inserted in the three pipe lines 200, respectively.

(S150: Grounding Step)

Next, as illustrated in FIG. 1, the inner shield layer 130 is directly grounded at the one end E1 of the power cable 100 in the axial direction. Meanwhile, the outer shield layer 150 is directly grounded at other end E2 of the power cable 100 in the axial direction. Here, at this time, the inner shield layer 130 is open at the other end E2 of the power cable 100 in the axial direction and the outer shield layer 150 is open at the one end E1 of the power cable 100 in the axial direction.

Next, the conductor 110 is connected to the electric power substation 500 at the one end E1 of the power cable 100 in the axial direction.

As such, in each of the three power cables 100, the inner shield layer 130 and the outer shield layer 150 are grounded by the predetermined grounding structure, and the conductor 110 is connected to the electric power substation 500. With this, the power cable system 10 is constructed.

(4) Effects of Embodiment

According to the embodiment, following one or more effects can be obtained.

(a) Only the inner shield layer 130, among the inner shield layer 130 and the outer shield layer 150, is directly grounded at the one end E1 of the power cable 100 in the axial direction. On the other hand, only the outer shield layer 150, among the inner shield layer 130 and the outer shield layer 150, is directly grounded at the other end E2 of the power cable 100 in the axial direction. Thus, for both cases when the electric power substation 500 is connected to the one end E1 of the power cable 100 in the axial direction and to the other end E2 of the power cable 100 in the axial direction, when a ground fault occurs in the power cable 100, the fault current can always safely flow (is released) to the earth ground at the electric power substation 500 side through the inner shield layer 130 or the outer shield layer 150. With this, the fault current is suppressed from flowing toward the earth ground at the electric power substation 500 side through the underground deep path, and the fault current is suppressed from diffusing outside the power path of the power cable system 10 in the ground.

(b) When the ground fault occurs, the fault current flows through one of the inner shield layer 130 and the outer shield layer 150 by returning at the fault point AP from the conductor 110. This means that the direction of the fault current that flows in the conductor 110 and the direction of the fault current that flows in one of the inner shield layer 130 and the outer shield layer 150 are opposite from each other. With this, the magnetic field generated around the power cable 100 due to the fault current that flows through the conductor 110 and the magnetic field generated around the power cable 100 due to the fault current that flows in one of the inner shield layer 130 and the outer shield layer 150 can be canceled with each other. As a result, generation of the communication failure in the communication device or the like near the power cable system 10 can be suppressed when the ground fault occurs.

(c) In this embodiment, the inner shield layer 130 and the outer shield layer 150 are incorporated in the power cable 100 and are directly grounded at opposite end portions from each other. With this, when the power cables 100 are installed along a long distance, and when it is difficult to provide a parallel ground wire as an ECC near the power cables 100, the inner shield layer 130 and the outer shield layer 150 in each of the power cables 100 can function as a path that releases the fault current instead of the ECC only by installing the power cable 100. Thus, the fault current can be safely released through either of the inner shield layer 130 and the outer shield layer 150. Thus, according to the embodiment, even when the power cables 100 are installed along a long distance, safety of the power cable system 10 can be retained without using the ECC.

(d) In this embodiment, the outer shield layer 150 is open at the one end E1 of the power cable 100 in the axial direction, while the inner shield layer 130 is open at the other end E2 of the power cable 100 in the axial direction. This means that each of the inner shield layer 130 and the outer shield layer 150 is an open circuit. With this, when a normal current flows through the power cable 100, a circulating current is suppressed from flowing through each of the inner shield layer 130 and the outer shield layer 150, and the inner shield layer 130 and the outer shield layer 150 are suppressed from being heated by Joule loss. As a result, lowering of the transmission capacity of the power cable 100 can be suppressed.

Although a preferred embodiment of the power cable, the power cable system, the method of grounding the power cable system and the method of constructing the power cable system has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention.

In the above described embodiment, a case is described in which the grounding structure of the power cable system 10 is applied when the three-phase power cables 100 are installed over a long distance with a space therebetween. However, the above described grounding structure of the power cable system may be applied even when the power cables are installed for a short distance, or when the three-phase power cables are installed in the vicinity with each other.

In the above described embodiment, a case is described in which the grounding structure of the power cable system 10 is applied when the three-phase power cables 100 are installed. However, the above described grounding structure of the power cable system may be applied even when a single power cable is installed. Alternatively, the above described grounding structure of the power cable system may be applied even when two, four or more power cables are installed.

In the above described embodiment, a case is described in which the inner shield layer 130 is configured as the extrusion sheath, and the outer shield layer 150 is configured by winding the plurality of flat wires 152. However, the outer shield layer may be configured as an extrusion sheath, not only the inner shield layer. Alternatively, one of the inner shield layer and the outer shield layer may be configured as a braiding layer in which metal wires are woven in a tubular shape.

In the above described embodiment, a case is described in which the inner shield layer 130 is directly grounded at the one end E1 of the power cable 100 in the axial direction and the outer shield layer 150 is directly grounded at the other end E2 of the power cable 100 in the axial direction, while the inner shield layer 130 is open at the other end E2 of the power cable 100 in the axial direction and the outer shield layer 150 is open at the one end E1 of the power cable 100 in the axial direction. However, each of the inner shield layer 130 at the other end E2 of the power cable 100 in the axial direction and the outer shield layer 150 at the one end E1 of the power cable 100 in the axial direction may not be completely open, but may be grounded via a surge arrestor as a countermeasure for transient phenomenon called serge. The surge arrestor means an element that shows high resistance in a normal state, but shows low resistance when overvoltage is applied. By applying such a grounding structure, even when the serge voltage is applied to the inner shield layer 130 or the outer shield layer 150, as the surge arrestor shows low resistance, a surge current can be safely released to the earth ground.

In the above described embodiment, a case is described in which the pipe line inserting hole 280 in which the pipe line 200 is inserted is excavated by horizontal directional drilling. However, the pipe line may be installed in the ground by another method.

Furthermore, the power cable 100 may not be inserted in the pipe line 200, and the power cable 100 may be directly buried in the ground.

According to the embodiments, safety can be ensured even when a power cable is installed over a long distance.

Various aspects of the subject-matter described herein are set out non-exhaustively in the following numbered clauses:

(Clause 1)

According to an embodiment, there is provided a power cable including:
  a conductor;
  an insulator;
  an inner shield layer;
  an inner corrosion-proof layer;
  an outer shield layer; and
  an outer corrosion-proof layer, provided from center toward outside,
  wherein only the inner shield layer among the inner shield layer and the outer shield layer is directly grounded at one end of the power cable in an axial direction, and
  wherein only the outer shield layer among the inner shield layer and the outer shield layer is directly grounded at the other end of the power cable in the axial direction.

(Clause 2)

The power cable according to clause 1 is configured, preferably, such that, for both cases when a power source that supplies electric power to the conductor is connected to the one end of the power cable in the axial direction, and to the other end of the power cable in the axial direction, when a ground fault occurs in the power cable, a fault current flows to an earth ground at a power source side through either of the inner shield layer and the outer shield layer.

(Clause 3)

The power cable according to clause 1 or 2, preferably, wherein the inner shield layer and the outer shield layer are insulated from each other by the inner corrosion-proof layer.

(Clause 4)

According to another embodiment, there is provided a power cable system including:
  a power cable including a conductor, an insulator, an inner shield layer, an inner corrosion-proof layer, an outer shield layer, and an outer corrosion-proof layer, provided from center toward outside,
  wherein only the inner shield layer among the inner shield layer and the outer shield layer is directly grounded at one end of the power cable in an axial direction, and
  wherein only the outer shield layer among the inner shield layer and the outer shield layer is directly grounded at the other end of the power cable in the axial direction.

(Clause 5)

The power cable system according to clause 4, preferably, further including a pipe line buried in the ground and through which the power cable is inserted.

(Clause 6)

The power cable system according to clause 5, preferably, further including:
  a plurality of the power cables; and a plurality of the pipe lines that are provided to be apart from each other in a horizontal direction,
wherein the plurality of the power cables are inserted in the plurality of pipe lines, respectively.
(Clause 7)
The power cable system according to one of clauses 4 to 6, preferably, wherein the distance of the power cable in an axial direction is greater than or equal to 1 km and less than or equal to 5 km.
(Clause 8)
The power cable system according to clause 6, preferably, wherein a space between the plurality of pipe lines is greater than or equal to 1.5 m and less than or equal to 20 m.
(Clause 9)
According to another embodiment, there is provided a power cable system including:
a plurality of pipe lines buried in the ground and provided to be apart from each other in a horizontal direction; and
a plurality of power cables inserted in the plurality of pipe lines, respectively,
each of the power cables including a conductor, an insulator, an inner shield layer, an inner corrosion-proof layer, an outer shield layer, and an outer corrosion-proof layer, provided from center toward outside,
wherein in each of the power cables, only the inner shield layer among the inner shield layer and the outer shield layer is directly grounded at one end of the power cable in an axial direction,
wherein in each of the power cables, only the outer shield layer among the inner shield layer and the outer shield layer is directly grounded at the other end of the power cable in the axial direction, and
wherein each of the power cables is configured such that, for both cases when a power source that supplies electric power to the conductor is connected to the one end of the power cable in the axial direction, and to the other end of the power cable in the axial direction, when a ground fault occurs in the power cable, a fault current flows to an earth ground at a power source side through either of the inner shield layer and the outer shield layer.
(Clause 10)
According to another embodiment, there is provided a method of grounding a power cable system, including:
preparing a power cable including a conductor, an insulator, an inner shield layer, an inner corrosion-proof layer, an outer shield layer, and an outer corrosion-proof layer, provided from center toward outside;
directly grounding only the inner shield layer among the inner shield layer and the outer shield layer at one end of the power cable in an axial direction; and
directly grounding only the outer shield layer among the inner shield layer and the outer shield layer at the other end of the power cable in the axial direction.
(Clause 11)
According to another embodiment, there is provided a method of constructing a power cable system, including:
excavating a pipe line inserting hole in the ground;
inserting a pipe line in the pipe line inserting hole;
inserting a power cable including a conductor, an insulator, an inner shield layer, an inner corrosion-proof layer, an outer shield layer, and an outer corrosion-proof layer, provided from center toward outside, in the pipe line;
directly grounding only the inner shield layer among the inner shield layer and the outer shield layer at one end of the power cable in an axial direction; and directly grounding only the outer shield layer among the inner shield layer and the outer shield layer at the other end of the power cable in the axial direction.
(Clause 12)
The method of constructing the power cable system according to clause 11, preferably, wherein in the excavating the pipe line inserting hole, the pipe line inserting hole is excavated by horizontal directional drilling.

What is claimed is:
1. A power cable comprising:
a conductor;
an insulator;
an inner shield layer;
an inner corrosion-proof layer;
an outer shield layer; and
an outer corrosion-proof layer, provided from center toward outside,
wherein only the inner shield layer among the inner shield layer and the outer shield layer is directly grounded at one end of the power cable in an axial direction, and
wherein only the outer shield layer among the inner shield layer and the outer shield layer is directly grounded at the other end of the power cable in the axial direction.
2. The power cable according to claim 1, wherein the power cable is configured such that, for both cases when a power source that supplies electric power to the conductor is connected to the one end of the power cable in the axial direction, and to the other end of the power cable in the axial direction, when a ground fault occurs in the power cable, a fault current flows to an earth ground at a power source side through either of the inner shield layer and the outer shield layer.
3. A power cable system comprising:
a power cable including a conductor, an insulator, an inner shield layer, an inner corrosion-proof layer, an outer shield layer, and an outer corrosion-proof layer, provided from center toward outside,
wherein only the inner shield layer among the inner shield layer and the outer shield layer is directly grounded at one end of the power cable in an axial direction, and
wherein only the outer shield layer among the inner shield layer and the outer shield layer is directly grounded at the other end of the power cable in the axial direction.
4. The power cable system according to claim 3, further comprising a pipe line buried in the ground and through which the power cable is inserted.
5. The power cable system according to claim 4, further comprising:
a plurality of the power cables; and
a plurality of the pipe lines that are provided to be apart from each other in a horizontal direction,
wherein the plurality of the power cables are inserted in the plurality of pipe lines, respectively.
6. The power cable system according to claim 5, wherein the power cable is configured such that, for both cases when a power source that supplies electric power to the conductor is connected to the one end of the power cable in the axial direction, and to the other end of the power cable in the axial direction, when a ground fault occurs in the power cable, a fault current flows to an earth ground at a power source side through either of the inner shield layer and the outer shield layer.
7. A method of grounding a power cable system, comprising:
preparing a power cable including a conductor, an insulator, an inner shield layer, an inner corrosion-proof layer, an outer shield layer, and an outer corrosion-proof layer, provided from center toward outside;

directly grounding only the inner shield layer among the inner shield layer and the outer shield layer at one end of the power cable in an axial direction; and directly grounding only the outer shield layer among the inner shield layer and the outer shield layer at the other end of the power cable in the axial direction.

8. A method of constructing a power cable system, comprising:

excavating a pipe line inserting hole in the ground;

inserting a pipe line in the pipe line inserting hole;

inserting a power cable including a conductor, an insulator, an inner shield layer, an inner corrosion-proof layer, an outer shield layer, and an outer corrosion-proof layer, provided from center toward outside, in the pipe line;

directly grounding only the inner shield layer among the inner shield layer and the outer shield layer at one end of the power cable in an axial direction; and directly grounding only the outer shield layer among the inner shield layer and the outer shield layer at the other end of the power cable in the axial direction.

* * * * *